2 Sheets—Sheet 1.
AULTMAN & MILLER.
Mowing Machine.
No. 776.
Reissued July 19, 1859.
Fig. 1,
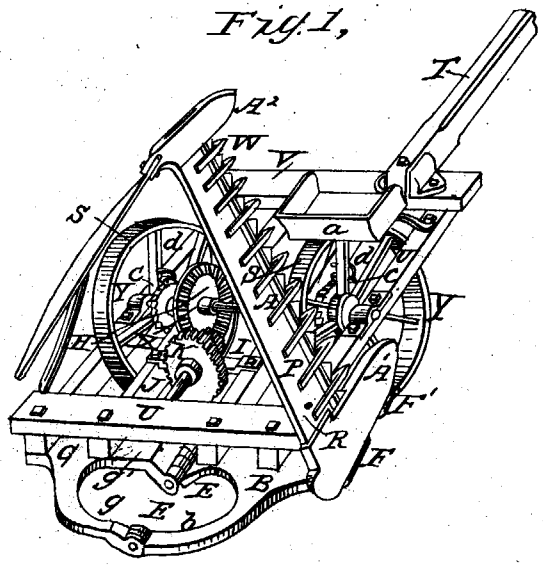
Fig. 2,
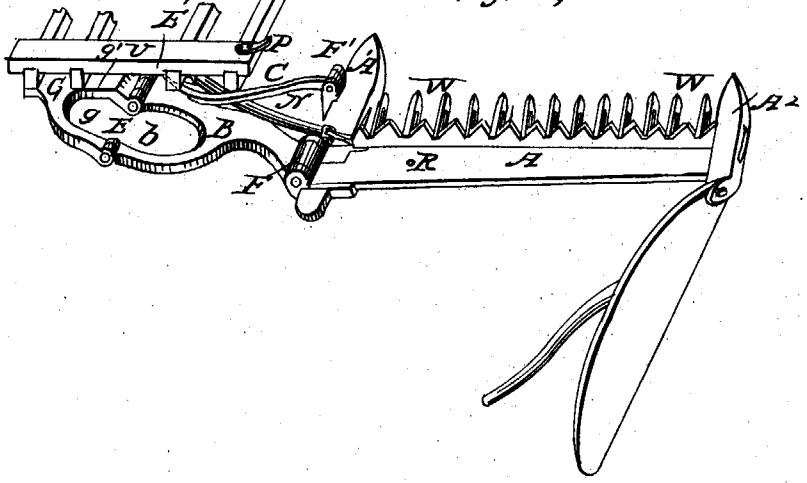
N. PETERS, Photo-Lithographer, Washington, D. C.

2 Sheets—Sheet 2.
AULTMAN & MILLER.
Mowing Machine.
No. 776.
Reissued July 19, 1859.
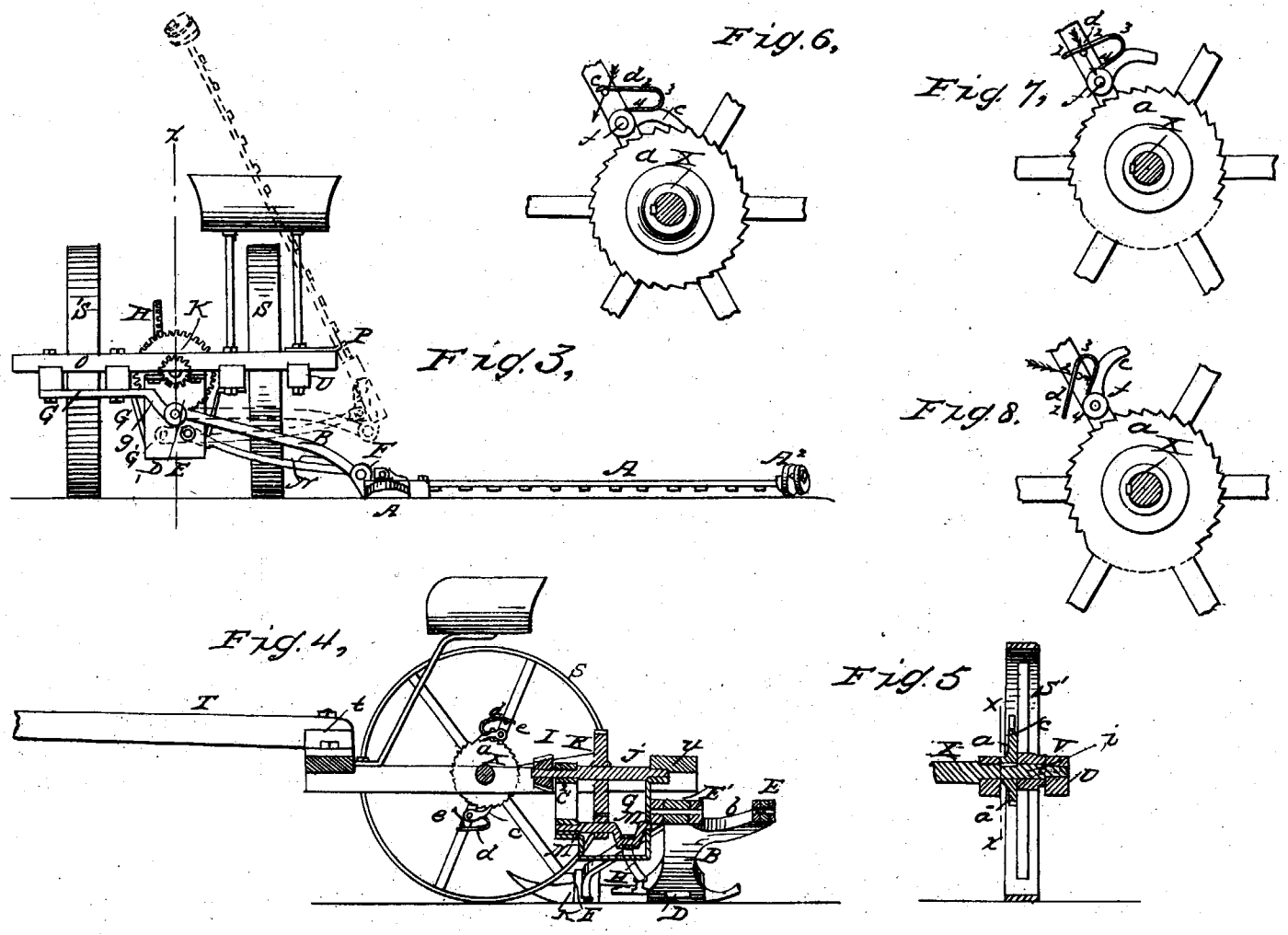
N. PETERS. Photo-Lithographer. Washington. D. C.

UNITED STATES PATENT OFFICE.

C. AULTMAN AND LEWIS MILLER, OF CANTON, OHIO, ASSIGNORS, BY MESNE ASSIGNMENTS, TO C. AULTMAN & CO.

IMPROVEMENT IN MOWING-MACHINES.

Specification forming part of Letters Patent No. 15,160, dated June 17, 1856; Reissue No. 776, dated July 19, 1859.

DIVISION G².

*To all whom it may concern:*

Be it known that we, CORNELIUS AULTMAN and LEWIS MILLER, both of Canton, in the county of Stark and State of Ohio, have invented an Improvement in Mowing-Machines, of which the following is a full, clear, and exact description, reference being had to the accompanying drawings, which make part of this specification, and in which—

Figure 1 represents a view in perspective of a mowing-machine which embraces our improvements, the finger-beam and cutter being raised on end and leaned against the side of the frame to adapt the machine to being drawn to or from the place of mowing. Fig. 2 represents a like view of the rear portion of the machine, with the finger-beam extended upon the ground ready for mowing. Fig. 3 represents an elevation of the rear of the machine, showing particularly the relative positions of the parts when the finger-beam is down on the ground ready for work and when it is raised for transportation. Fig. 4 represents a section of the machine on the right of the line *x x* of Fig. 3. Fig. 5 represents an axial vertical section through one of the supporting-wheels, one of the ratchet-wheels, and that end of the axle on which these wheels are mounted, and a transverse section of those portions of the frame which are cut by the plane of the section through the wheel and axle. Fig. 6 represents a transverse section at the line *y y* of Fig. 5, and an elevation of the parts to the right of that line, except the frame and the rim and the outer ends of the spokes of the driving-wheel, showing particularly the relative position of the spring and pawl with the other parts when the pawl is in gear with the ratchet-teeth. Fig. 7 represents the same view of the parts shown in Fig. 6, but with the spring and pawl in a second and different position from the one shown in that figure. Fig. 8 represents the same view of the parts shown in Fig. 6, but with the spring and pawl in a third position, different from those shown in Figs. 6 and 7.

We term that side of the machine the "right" side which would be at the right hand of a person behind the machine and looking toward it, and the opposite side of the machine we term its "left" side.

It is desirable in a reaping or mowing machine that the mechanism for connecting and disconnecting the driving-wheels with the gearing should be very simple in its construction, easily operated, of few parts, and not liable to get out of order, and that the connection or disconnection and the adjustment whereby the stability of either of these conditions is maintained as long as desired should consist of a single movement only, as the working of the machines is usually hurried by reason of the shortness of harvest-time, and they are usually managed by laborers who are unskilled in machinery and very liable to mismanage or neglect complicated adjustments. With a view to supply this desideratum we have contrived a combination of a ratchet-wheel, a ratchet-pawl, a spring, and a bearing-pin for the spring with the driving-wheel and the axle of the main gear-wheel in such manner that when the tooth of the pawl is depressed by the attendant into gear with the teeth of the ratchet the spring will without any care or attention be adjusted so that it will bear down upon the pawl and hold it in gear with the ratchet-teeth, and when the tooth of the pawl is raised by the attendant to withdraw it from the teeth of the ratchet the same spring will in this case, also, without care or attention, be adjusted so that it will press the pawl upward and hold it out of gear with the ratchet-teeth, thus making a single spring perform the two duties of holding the pawl out of gear and in gear with the ratchet-wheel, the spring being self-adjusting to adapt itself to the performance of the two duties, leaving for the manager of the machine nothing more than simply turning the pawl up or down as he may want to disconnect or connect the gearing and the driving-wheels.

The accompanying drawings represent a mowing-machine whose gearing is arranged within a frame, U, supported by two large wheels, S S′, on an axle, X, which is common to both the wheels, and likewise to the main gear-wheel H, which is firmly keyed to it, so that whenever the axle turns the gear-wheel will also turn, and when the axle ceases to turn so will the gear-wheel also cease to turn.

On each end of the axle is a journal fitted to a bearing in a box, Y, on the top of the side beams of the main frame. Within each of these journals is another journal, *i*, which fits loosely in the eye of the supporting-wheel, so that the wheel can revolve freely on this journal or bearing of the axle. A ratchet-wheel, *a*, is keyed firmly to the axle at the inner end of each of the bearings *i*, the ratchet-teeth being inclined in a direction opposite to that in which the supporting-wheels S S′ revolve when the machine is going forward.

To the inside of one of the arms of each supporting-wheel a pawl, *c*, is pivoted, with its toothed end pointing in the direction in which the supporting-wheels revolve. When the teeth of these pawls are depressed they engage with the teeth of the ratchet-wheels, and when the machine is moving forward they lock the supporting-wheels S S′, the axle X, and the gear-wheel H together, so as to make both supporting-wheels co-operate in driving the gearing.

For the purpose of preventing the pawls from being thrown out of gear with the ratchet-wheels by the jolting of the machine when at work, and thereby stopping the cutter and making a balk in the mowing, a curved spring, *d*, is attached to the back of each pawl, which bears upon a pin, *e*, on the side of the arms of the wheel, near the pivot of the pawl, as shown in Figs. 4 and 6, and tends constantly, when in this position, to press the pawl into gear with the ratchet-teeth. This spring is designed not only to hold the pawl in gear with the ratchet-teeth when engaged therewith, but also to hold it out of gear when disengaged therefrom to prevent the jolting of the machine from accidentally connecting the carrying and gear wheels by throwing the tooth of the pawl down into gear with the ratchet-wheel, and thereby producing a shock that would be very likely to break the gearing. The action of this spring-pawl is illustrated by Figs. 6, 7, and 8, in which the pawl *c* is of the usual form, and has a spring, *d*, bent into the form represented, attached to its back. The acting portion of the spring is between the points 1 and 2, and the portion between 3 and 4 is merely for the purpose of fastening it to the pawl and holding the acting portion in a position nearly parallel to a line drawn from the center of the pivot *f* to the tooth of the pawl, and at a distance from that line a little less than the distance between the center of the pin *e* on the arm of the wheel for the spring to bear against and the center of the pivot *f* of the pawl, so that it will be necessary, in setting the pawl on its pivot and the spring on that side of the bearing-pin *e* next the periphery of the wheel, to deflect the spring until its tension at the middle point, 5, Fig. 7, in the acting part of the spring will be equal to about double the force which it is required to exert upon the pawl to hold its tooth either in or out of gear with the ratchet-teeth. In the position shown in Fig. 7, when the middle 5 of the acting part of the spring is bearing upon the pin in the arm the pressure of the spring is in the direction of a line drawn through the centers of the pivot of the pawl and the bearing-pin, and therefore does not tend to depress or raise the pawl on either side of its pivot, and leaves it equally free to be turned either way, and this point 5 in the spring we have therefore designated as its "neutral" point, since, however hard it may press upon the bearing-pin, such pressure has no tendency to move the pawl. If the pawl be now turned on its pivot so as to depress its tooth, as in Fig. 6, into gear with the ratchet-teeth, the bearing of the spring upon the pin will be changed from the point 5 to the point 1 behind the neutral point 5, and the direction of the pressure will be in a line passing through the bearing-pin a considerable distance behind the pivot of the pawl, and will tend to raise the rear end of the pawl and depress its toothed end, thereby holding it in gear with the ratchet-teeth. If the pawl be now turned on its pivot to raise it from the position shown in Fig. 6 to the position shown in Fig. 8, the bearing of the spring upon the pin will be at a point, 2, between the neutral point 5 and the tooth of the pawl, and the direction of the pressure will be in a line passing through the bearing-pin a considerable distance in front of the pivot of the pawl, and will of course tend to hold up the tooth of the pawl out of gear with the ratchet-wheel. The reacting pressure of the spring upon the pawl is always opposite in direction to its direct pressure upon the bearing-pin in the arm. By this arrangement the same spring is made to hold the pawl both in and out of gear with the ratchet-wheel. If one of these spring-pawls should be deemed insufficient to connect the gearing and driving-wheel, a greater number may be employed, and the form of the spring may be changed in various ways and its principle of action still retained; but such modifications merely require the skill of the workman to adapt the improvement to the particular circumstances under which it is to be used, and therefore need not be here described.

What we claim under this patent as our invention is—

The combination of a ratchet-wheel, a ratchet-pawl, a spring acting on the pawl, and a bearing-pin, or the equivalent thereof, for the spring, with the driving-wheel and the axle of the main gear-wheel, whereby one spring is made to perform the two duties of holding the pawl both in and out of gear with the ratchet-wheel, substantially as described.

In testimony whereof we have hereunto subscribed our names.

CORNELIUS AULTMAN.
LEWIS MILLER.

Witnesses:
DANIEL TONNER,
FRED ORTH.